June 25, 1963 M. G. BUNDY 3,095,125
LIQUID MEASURING AND DISPENSING DEVICE
Filed Feb. 29, 1960 3 Sheets-Sheet 2

Inventor
Maurice G. Bundy
By Silverman, Mullin & Cass
Attorneys

June 25, 1963 M. G. BUNDY 3,095,125
LIQUID MEASURING AND DISPENSING DEVICE
Filed Feb. 29, 1960 3 Sheets-Sheet 3

Inventor
Maurice G. Bundy
By
Gelauman, Mullin & Cass
Attorneys

United States Patent Office 3,095,125
Patented June 25, 1963

3,095,125
LIQUID MEASURING AND DISPENSING DEVICE
Maurice G. Bundy, Kansas City, Mo., assignor to The Industrial Fumigant Co., Kansas City, Mo., a corporation of Illinois
Filed Feb. 29, 1960, Ser. No. 11,615
4 Claims. (Cl. 222—309)

This invention relates generally to liquid dispensing devices and more particularly to a device for delivering measured quantities of a liquid under pressure.

While capable of other uses, the invention is particularly designed and adapted to deliver small measured quantities of liquid fumigant as required for infestation control in cereal mills, grain processing equipment, and the like. Since such fumigation operations are generally carried on in very large, and frequently many storied, processing structures, the problem of delivering the fumigant to all areas within the structure is a difficult one.

In the typical fumigation operation there is generally provided a single centrally located storage tank or container in which a relatively large supply of liquid fumigant is stored under pressure. Since it is often necessary to administer measured dosages of the fumigant to points which are far remote from the central storage tank, heretofore the use of some type of auxiliary apparatus was necessary in order to obtain the measured dosages of fumigant as required. It was necessary to place the auxiliary apparatus in close proximity to the area to be fumigated. The actual delivery nozzle and hose were attached to the auxiliary device. While such apparatus was portable in the sense that it could be carried by one man, it was nonetheless burdensome and time consuming to carry the same from place to place within the storage structure as required. In the alternative, it was necessary to position a plurality of these expensive pieces of equipment at strategic points within the storage structure, such as on each floor of a many storied cereal processing plant.

It is therefore an important object of this invention to provide a liquid measuring and dispensing device which eliminates the need for all auxiliary apparatus of the type described. In this regard, the invention comprises a lightweight and completely self-contained unit made in the form of a handy gun which includes the dispensing nozzle and a novel measuring device. Thus, the invention may be attached to a delivery hose of any required length, and the fumigant readily administered wherever required.

Frequently, the above described auxiliary apparatus included electrically operated relay circuits and the like for accurately controlling the measuring cycles. Of course, the use of electricity in closed areas such as storage bins or cereal processing plants is inherently dangerous because of the presence of readily ignitable grain dust.

It is therefore another object of this invention to afford a liquid measuring and dispensing device of the character described which eliminates the use of electricity but nonetheless delivers an accurately measured dosage with each cycle of operation.

Another object is to provide a liquid measuring and dispensing device of the character described which is readily adjustable so that the fumigant dosage may be varied as desired.

Yet another object is to provide a liquid measuring and dispensing device of the character described which acts positively to accurately terminate each cycle of operation, thereby preventing leakage or dripping of the usually corrosive and sometimes toxic fumigant. In this regard, the device utilizes the existing pressure from the central storage tank and operates on a pressure differential principle.

A further object is to afford a liquid measuring and dispensing device of the character described which is completely and expeditiously primed so that the same is immediately ready for use at all times.

Still another object is to provide a liquid measuring and dispensing device of the character described which is most simple to operate, it being necessary only to squeeze the trigger of the gun for each cycle of operation.

Still a further object is to afford a liquid measuring and dispensing device of the character described which may be economically manufactured and maintained and yet is most durable and reliable in operation.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of my invention, I have illustrated in the accompanying drawings a preferred embodiment thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings:

FIG. 5 is a sectional view taken on the plane of line 5—5 in FIG. 2 and viewed in the direction indicated; and FIG. 6 is a fragmentary sectional view taken on the plane of line 6—6 in FIG. 2 and viewed in the direction indicated.

Figure 1:
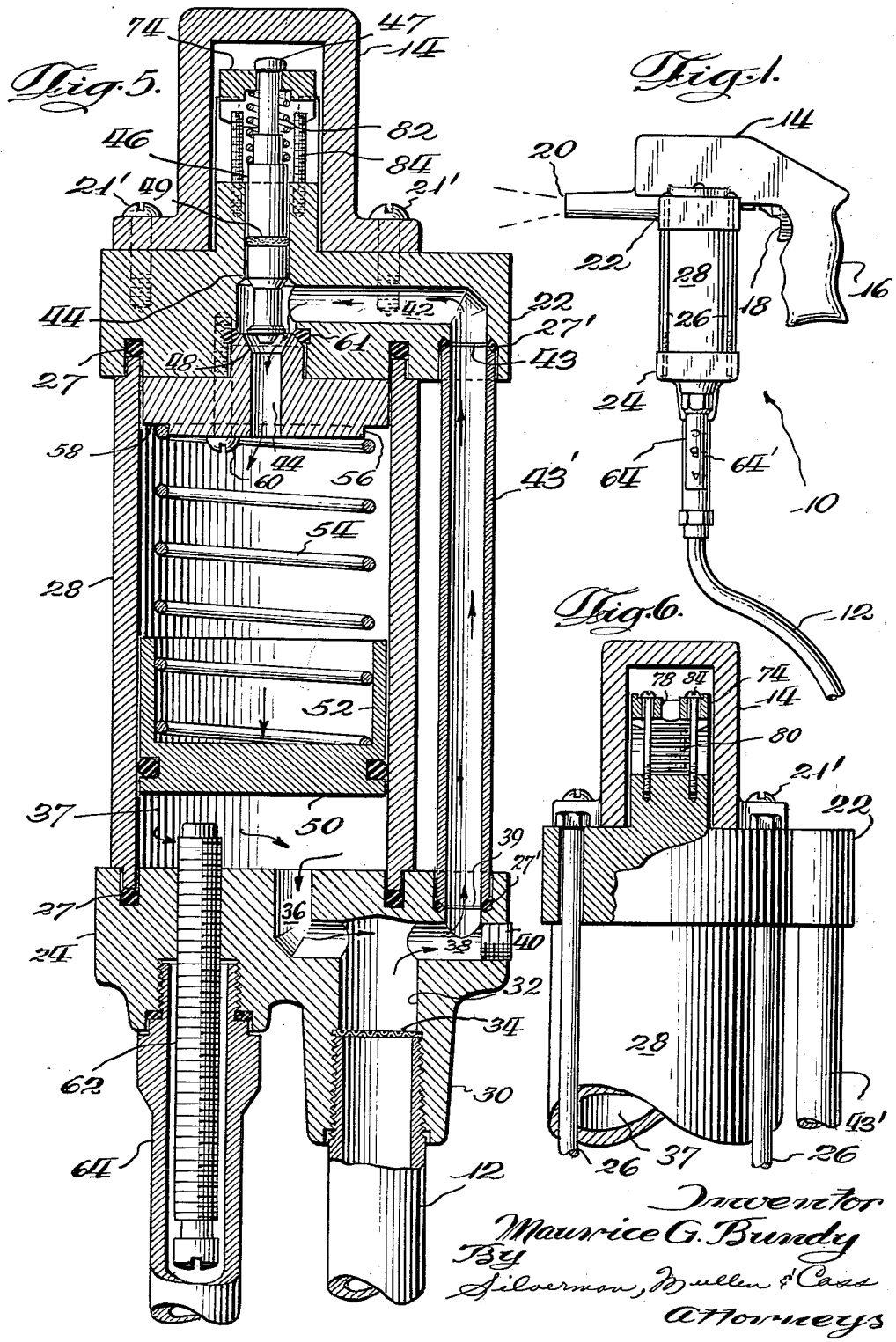
FIG. 1 is a side elevational view of the invention in operation.

Referring now to the FIG. 1 of the drawings, the reference character 10 indicates generally my new and improved liquid measuring and dispensing device. The device 10 is connected to a supply hose 12 which is in turn connected directly to a storage tank (not shown) in which a supply of liquid fumigant or the like is maintained under pressure. The fumigant itself may comprise any of those which are in common usage, such as mixtures of ethylene dibromide and methyl bromide, carbon tetrachloride and ethylene dibromide, or the like. Since the device 10 is connected directly to the storage tank, it will thus be seen that the device 10 is primed with liquid fumigant at all times.

The device 10 comprises an upper gun-like housing 14 having a handle 16, a trigger 18 and a barrel or nozzle 20. The nozzle 20 is formed with a discharge passageway 21. Secured to the housing 14 as by screws 21', is a depending collar member 22. A second collar member 24 may be connected in spaced relationship to the collar member 22 as by means of the long connecting bolts 26. A tubular cylinder 28 may be secured in watertight relationship between the collar members 22 and 24 and annular compressable gaskets such as 27 may be utilized to insure the watertight relationship.

The second collar member 24 is formed with a depending nipple 30 having a central bore 32 (see FIG. 5). The nipple 30 may be internally screw threaded for ready connection thereto of the supply hose 12 which may be externally screw threaded in the manner illustrated. A suitable strainer such as 34 may be positioned in the bore 32 to prevent any foreign matter from entering the interior of the device 10. Communicating with the bore 32 is a pair of diverging elbow-shaped passageways 36 and 38. A removable screw threaded service plug 40 may be provided for purposes of cleaning and the like. It is important to note that the passageway 36 communicates with the interior 37 of the cylinder 28 while the passageway 38 terminates at a point 39 exterior of said cylinder for reasons which will become apparent as the description proceeds.

The collar member 22 is formed with an elbow-shaped passageway 42 which likewise terminates at a point 43 which is exterior of the cylinder 28, and is in aligned position with the point 39 of the passageway 38 in the collar member 24. Connected between the points 39 and 43 of the passageways 38 and 42 is a bypass pipe 43', and a pair of annular sealing gaskets such as 27' may be employed to make this connection watertight. It will thus be seen that as the liquid fumigant enters from the supply hose 12, it automatically is divided into two streams, one through the passageway 36 into the cylinder 28 and one through passageway 38 and bypass pipe 43' into the passageway 42 of the collar member 22.

Figure 2:
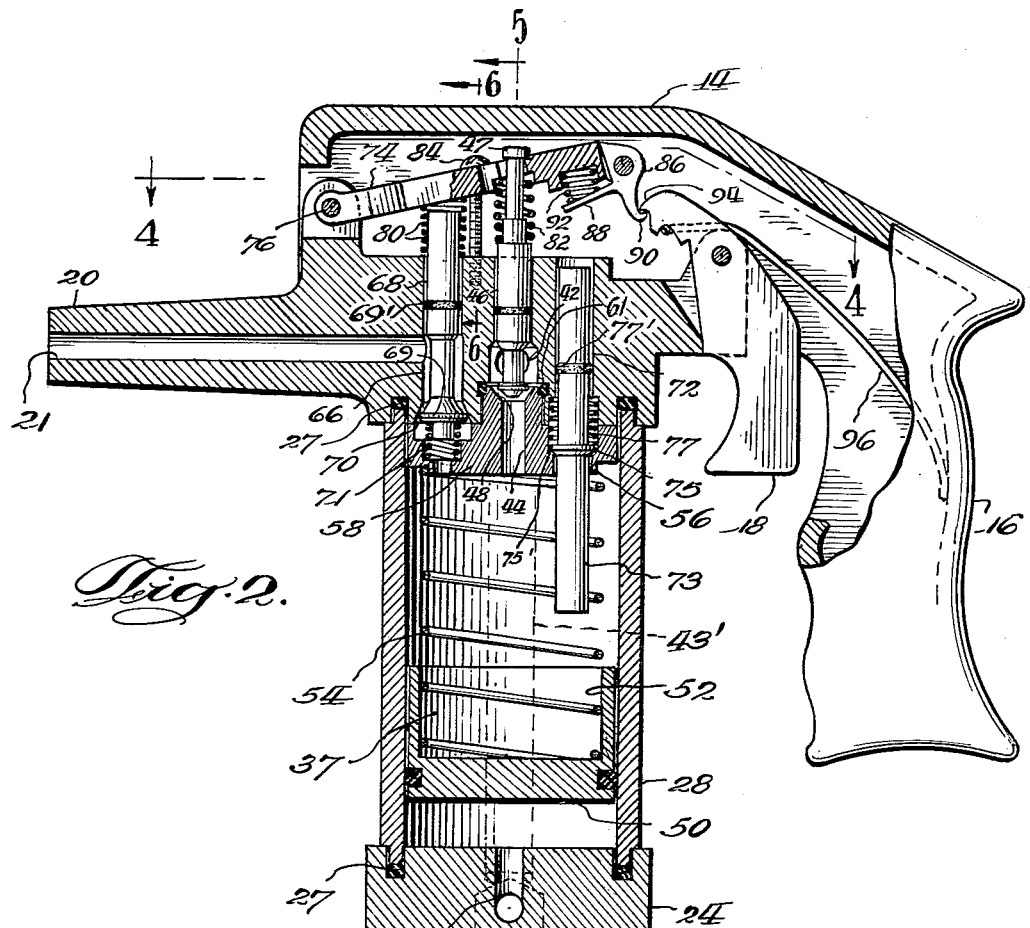
FIG. 2 is an enlarged vertical sectional view showing the position of the various components parts prior to firing.

Referring now to FIGS. 2 and 5, it will be seen that the collar member 22 is formed with a central bore 44 in which is reciprocably positioned a plunger 46 for opening and closing a valve 48. The plunger 46 is provided with an enlarged top head 47 for reasons which will be subsequently described. The bore 44 communicates both with the interior 37 of the cylinder 28 and the passageway 42. Since the valve 48 is normally maintained in the open condition (as shown in FIGS. 2 and 5), by means which will likewise be subsequently described, it will thus be seen that the stream of liquid fumigant which flows through the bypass pipe 43' likewise enters the cylinder 28, but from the top thereof. The plunger 46 may be provided with a disc 49 for effecting the closure of the valve 48, and a suitable O ring such as 49' for preventing the flow of liquid up through the bore 44.

Positioned within the cylinder 28 is a piston 50 having an annular upstanding rim 52. A rated coil spring 54 is positioned with one end thereof within the rim 52, and with the opposite end thereof encircling a depending shoulder 56 formed in the collar member 22, said spring 54 thus being adapted to normally urge the piston 50 downwardly. The shoulder 56 may be integrally formed on the collar member 22 or, as illustrated, may be part of a separate block 58 which also provides the seat for the valve 48. The block 58 may be secured to the collar member 22 by any suitable means such as the screw 60, and a sealing gasket such as 61 may be packed therebetween.

Since all of the liquid which enters the cylinder 28 comes from a single source, it will be appreciated that the pressures exerted by said liquid on the top and bottom surfaces of the piston 50 are substantially the same. However, the additional pressure exerted on the top surface of the piston 50 by the spring 54 forces the piston downwardly toward the second collar member 24. It will thus be seen that as thus far described the entire cylinder 28 will normally be filled with liquid above the piston 50, and there will be little or no liquid in the cylinder under the piston.

Positioned in the second collar member 24 and protruding upwardly into the interior 37 of the cylinder 28 is an adjustable set screw 62. The set screw 62 serves as a stop for the piston 50 and limits the distance which the piston may be pushed downwardly, thereby affording a space beneath the piston into which liquid may enter and collect. A removable shield 64 bearing suitable dosage calibrations 64' (see FIG. 1) may be screwed into the collar member 24 to encase the outwardly projecting portion of the set screw 62 (see FIG. 5). It will thus be seen that the exact amount of liquid which enters the cylinder 28 above the piston 50 may be readily controlled by merely setting the set screw 62 at the desired dosage calibration 64'. This measured amount of liquid comprises substantially a single dosage of fumigant which is dischargeable in a manner which will be subsequently described. The shield 64 also serves the additional function of preventing any inadvertent movement of the set screw 62 once the same has been set for the desired dosage.

Figure 3:
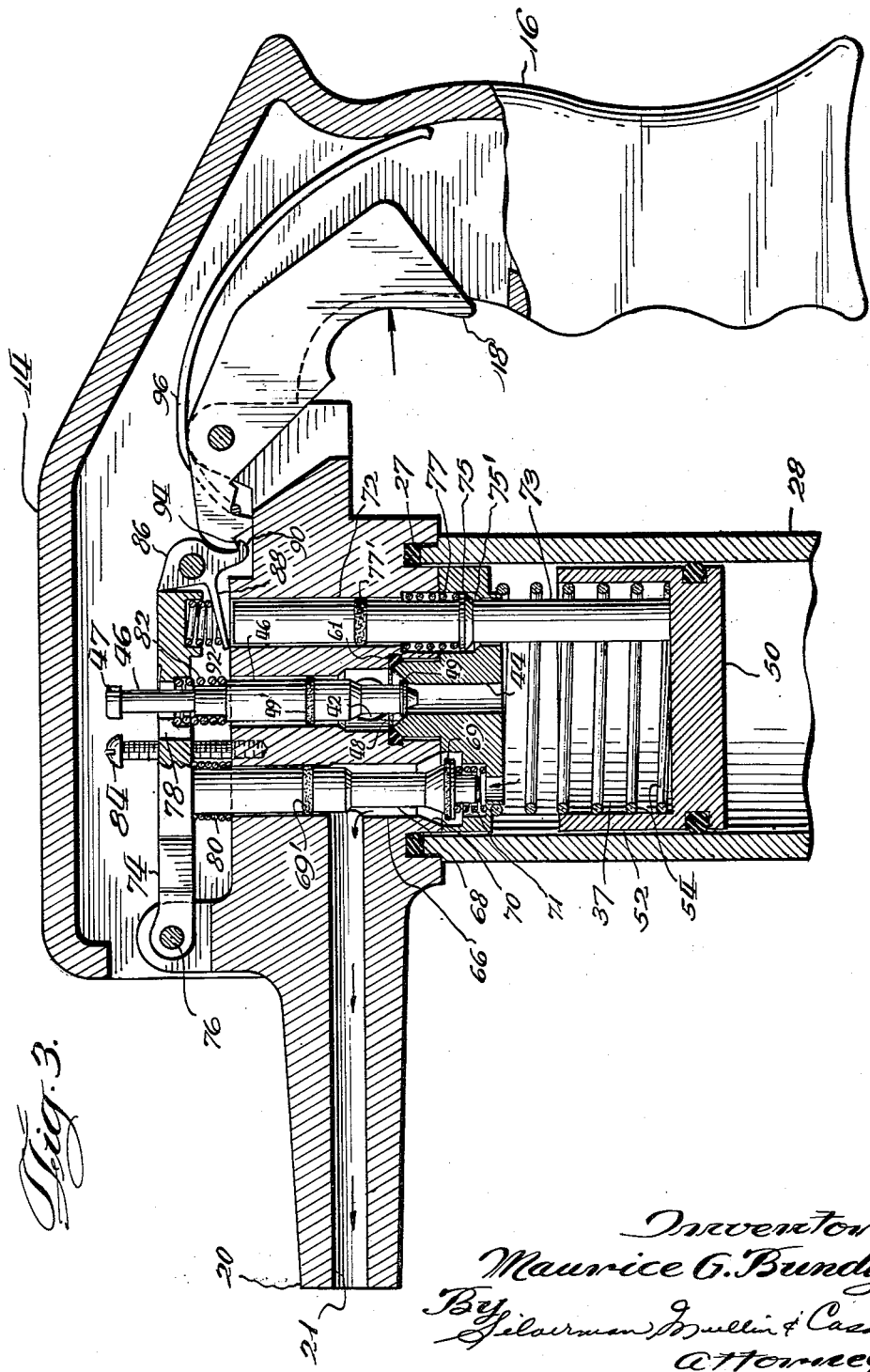
FIG. 3 is a further enlarged fragmentary vertical sectional view showing the position of the various component parts during firing.

Formed in the collar member 22 is a second bore 66 in which is reciprocably positioned a plunger 68 for opening and closing a valve 70. As seen in FIGS. 2, 3 and 5, the bore 66 communicates with the cylinder 28 and the discharge passageway 21. A coil spring 71 is positioned to normally urge the plunger 68 upwardly and thereby close the valve 70 (see FIG. 2). The plunger 68 may be provided with a suitable bottom O-ring 69 for effecting the closure of the valve 70, and a suitable O-ring 69' for preventing the flow of liquid up through the bore 66.

A third bore 72 is likewise formed in the collar member 22. Reciprocably positioned in the bore 72 is cut-off means including a spacing rod 73. The spacing rod 73 may be provided with an annular shoulder 75, and a coil spring 77 is mounted to bear thereagainst and normally urge the rod 73 downwardly into the interior 37 of the cylinder 28. The annular shoulder 75 also bears against a complementary shouder 75' formed in the block 58, to limit the downward motion of the spacing rod 73. A suitable O-ring such as 77' may be mounted on the spacing rod 73 to prevent the flow of liquid up into the bore 72. The function of the spacing rod 73 as a cut-off means will become apparent as the description proceeds.

Figure 4:
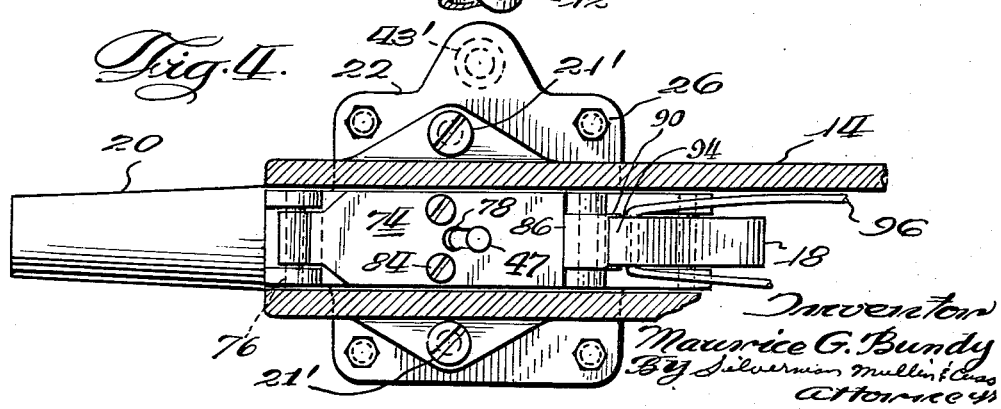
FIG. 4 is a sectional view taken generally on the plane of irregular line 4—4 in FIG. 2 and viewed in the direction indicated.

Activating means for the device 10 includes an activating lever 74 pivotally mounted in the housing 14 as at 76. Formed in the activating lever 74 is a bayonet type slot 78 (see FIGS. 4 and 6) through which is loosely positioned the plunger 46 with the top head 47 thereof abutting the top surface of the lever 74. Said activating means also includes a pair of springs 80 and 82 coiled about the plungers 68 and 46 respectively, said springs being adapted to normally urge the activating lever 74 upwardly. A pair of headed screws such as 84 may be provided far limiting the upward path of motion of the lever 74. Since the top head 47 of the plunger 46 moves upwardly with the activating lever 74, it will thus be seen (FIG. 2) that the primed condition wherein the valve 48 is open and the valve 70 is closed is normally maintained.

Pivotally mounted on the free end of the activating lever 74 is a bell crank 86 having a straight arm 88 and a hooked arm 90. A coil spring 92 is positioned between the bottom surface of the lever 74 and the straight arm 88, said spring being adapted to urge the arm 88 away from the lever 74. The trigger 18 is provided with a claw 94 which is adapted to cooperate with the hooked arm 90 of the bell crank 86. A suitable bias spring such as 96 is provided for normally urging the trigger 18 upwardly.

The operation of the device 10 may now be described as follows:

As already described, the interior 37 of the cylinder 28 above the piston 50 is filled with a measured single dosage of liquid as pre-determined by the setting of the set screw 62. The space below the piston 50 is of course likewise filled with liquid. When the trigger 18 is squeezed, the claw 94 cooperates with the hooked arm 90 of the bell crank and pivots the activating lever 74 downwardly so that the various members are positioned as shown in FIG. 3 of the drawings. It will thus be noted that the spring 82 is compressed and the plunger 46 moved downwardly to close the valve 48. Simultaneously, the springs 80 and 71 are likewise compressed and the plunger 68 is moved downwardly to open the valve 70. Since the liquid is no longer entering the cylinder 28 through the passageway 42, the pressure of the fluid below the piston 50 is now sufficient to overcome the force of the rated spring 54 with the result that the piston 50 is forced upwardly. The upward movement of the piston 50 forces the fluid above the same out through the open valve 70 and out of the device through the discharge passageway 21. When the piston 50 approaches the top of the cylinder 28, it comes into contact with the spacing rod 73 and forces the same upwardly. As the spacing rod 73 continues upwardly, it contacts the straight arm 88 of the bell crank 86 and moves the same against the normal action of the spring 92. The pivoting of the bell crank 86 causes the hooked arm 90 to disengage from the trigger claw 94, and the springs 80 and 82 then force the activating plate 74 upwardly to complete the cycle of operation and return the device to its normal condition.

The actions of the various springs and other moving members are such that during the interval when the activating lever 74 is moving upwardly, the original primed condition is once again created. Thus, even if the trigger 18 is released at the very instant when the fluid stops discharging from the nozzle 20, the device 10 is nonetheless immediately ready for a new discharge cycle when the trigger claw 94 engages the hooked arm 90.

From the foregoing description and drawings, it should be apparent that I have provided a novel liquid measuring and dispensing device which is ideally suited for the dispensing of measured amounts of liquid fumigant as required for infestation control in grain storage bins and the like. The device is in the form of a handy self-contained gun which may be readily attached to a supply hose of any length, thus eliminating entirely the need for auxiliary apparatus of the type heretofore required. The gun is always primed and ready for firing. In addition, the exact amount of each dosage may be accurately controlled by a simple adjustment of the set screw.

It is believed that my invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claims.

What I claim and desire to secure by Letters Patent of the United States is:

1. A liquid measuring and dispensing device comprising a cylinder adapted to be connected to a source of liquid under pressure, a discharge nozzle in fluid communication with the top of said cylinder, by-pass means in said cylinder for dividing said liquid into two streams so that one of said streams enters said cylinder from the bottom thereof and the other stream enters said cylinder from the top thereof, a piston reciprocably positioned in said cylinder, a coil spring positioned in said cylinder for normally urging said piston downwardly, an adjustable set screw protruding into said cylinder through the bottom thereof for limiting the downward movement of said piston and thereby selectively controlling the amount of liquid in said cylinder above said piston, first valve means in the top of said cylinder for normally admitting said other stream of liquid into said cylinder, said first valve means including a reciprocable plunger for closing the same when moved downwardly, second valve means in the top of said cylinder for normally closing the fluid communication between said cylinder and said discharge nozzle, said second valve means including a reciprocable plunger for opening the same when moved downwardly, an activating lever pivotally mounted at one end thereof on said cylinder above said plungers, spring means for normally urging said lever upwardly, a bell crank pivotally mounted on the free end of said lever, said bell crank including a hooked arm and a straight arm, spring means positioned to normally urge said straight arm away from said lever, a handle secured to said cylinder, a spring-biased trigger having a claw mounted in said handle, said claw engageable with said hooked arm for moving said lever downwardly so that said lever urges both of said plungers downwardly whereupon the pressure of said one stream of liquid forces said piston upwardly to dispense the liquid thereabove out of said discharge nozzle, and a spacing rod reciprocably mounted in the top of said cylinder and protruding thereinto, said spacing rod being movable upwardly by said piston as said piston approaches the top of said cylinder, said spacing rod cooperating with said straight arm to disengage said hooked arm from said claw and thereby release said lever when the liquid in said cylinder above said piston has been discharged.

2. The liquid measuring and dispensing device of claim 1 in which a calibrated shield is removably mountable to encase the exposed portion of said set screw, said calibrations providing selective settings for said set screw to accurately measure the amount of liquid in said cylinder above said piston.

3. A liquid measuring and dispensing device comprising a tubular housing adapted to be connected to a source of liquid under pressure, a discharge nozzle in fluid communication with said housing, a piston reciprocably positioned in said housing, means positioned in said housing for normally urging said piston downwardly, by-pass means in said housing for dividing said liquid into two streams so that one stream enters said housing below said piston and the other stream enters said housing above said piston, first valve means in said housing for normally admitting said other stream of liquid into said housing, said first valve means including a reciprocable plunger for closing the same when moved downwardly, second valve means in said housing for normally closing the fluid communication between said body and said discharge nozzle, said second valve means including a reciprocable plunger for opening the same when moved downwardly, activating means on said housing for reversing the normal condition of said first and second valve means whereby the pressure of said one stream of liquid forces said piston upwardly to dispense the liquid thereabove out of said discharge nozzle, said activating means comprising a lever pivotally mounted at one end thereof on said housing above said plungers and spring means for normally urging said lever upwardly, said lever movable to simultaneously urge both of said plungers downwardly, cut-off means in said housing for releasing said activating means when the liquid above said piston is dispensed so that said first and second valve means are returned to their normal condition, said cut-off means comprising a spacing rod reciprocably mounted in the top of said housing and protruding thereinto, said spacing rod being movable upwardly by said piston as said piston approaches the top of said housing, and a bell crank pivotally mounted on the free end of said lever, said valve crank including a hooked arm and a straight arm, and spring means positioned to normally urge said straight arm away from said lever.

4. The liquid measuring and dispensing device of claim 3 in which a handle is secured to said housing, a spring-biased trigger mounted in said handle, said trigger including a claw, said claw engageable with said hooked arm for moving said lever downwardly, said straight arm movable by said spacing bar to disengage said hooked arm from said claw and thereby release said lever.

References Cited in the file of this patent

UNITED STATES PATENTS

| | | |
|---|---|---|
| 1,454,765 | Patterson et al. | May 8, 1923 |
| 2,051,290 | Davis | Aug. 18, 1936 |
| 2,300,110 | De Hoog | Oct. 27, 1942 |
| 2,443,146 | Pyles | June 8, 1948 |
| 2,573,954 | Casson | Nov. 6, 1951 |
| 2,589,977 | Stelzer | Mar. 18, 1952 |
| 2,591,585 | Moore | Apr. 1, 1952 |
| 2,814,422 | Mercier | Nov. 26, 1957 |